(12) United States Patent
Kim et al.

(10) Patent No.: US 12,248,760 B2
(45) Date of Patent: Mar. 11, 2025

(54) ELECTRONIC DEVICE AND METHOD FOR CONTROLLING THE ELECTRONIC DEVICE THEREOF

(71) Applicant: Samsung Electronics Co., Ltd., Suwon-si (KR)

(72) Inventors: Jiwan Kim, Suwon-si (KR); Insoo Chung, Suwon-si (KR); Jonghyun Kim, Suwon-si (KR); Soyoon Park, Suwon-si (KR); Indong Lee, Suwon-si (KR); Sungjun Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 281 days.

(21) Appl. No.: 17/747,399

(22) Filed: May 18, 2022

(65) Prior Publication Data

US 2022/0318524 A1 Oct. 6, 2022

Related U.S. Application Data

(63) Continuation of application No. PCT/KR2021/012761, filed on Sep. 17, 2021.

(30) Foreign Application Priority Data

Oct. 27, 2020 (KR) .................. 10-2020-0140660

(51) Int. Cl.
*G06F 40/58* (2020.01)
*G06F 40/51* (2020.01)
(Continued)

(52) U.S. Cl.
CPC .............. *G06F 40/58* (2020.01); *G06F 40/51* (2020.01); *G06V 30/147* (2022.01); *G06V 30/153* (2022.01)

(58) Field of Classification Search
CPC .................................. G06F 40/58; G06F 40/51
See application file for complete search history.

(56) References Cited

U.S. PATENT DOCUMENTS

| 8,965,129 B2 | 2/2015 | Rogowski et al. |
| 9,082,035 B2 | 7/2015 | Hwang et al. |
| (Continued) | | |

FOREIGN PATENT DOCUMENTS

| CN | 110991196 A | 4/2020 |
| KR | 10-2005-0064574 A | 6/2005 |
| (Continued) | | |

OTHER PUBLICATIONS

International Search Report with Written Opinion and English translation dated Dec. 28, 2021; International Appln. No. PCT/KR2021/012761.

*Primary Examiner* — Ibrahim Siddo
(74) *Attorney, Agent, or Firm* — Jefferson IP Law, LLP

(57) ABSTRACT

An electronic device and a method of controlling an electronic device are provided. The method includes obtaining an image comprising a text through a camera, identifying an input text, among texts included in the image, to be translated, obtaining a first vector corresponding to the input text by inputting the identified input text to an encoder of a translation model, identifying whether additional information is necessary to translate the input text by inputting the first vector to a first artificial intelligence model trained to translate the input text, based on identification that the additional information is necessary, identifying additional information among the at least one context information by inputting the first vector and at least one context information obtained from the image, and obtaining an output text corresponding to the input text by inputting the first vector and the identified additional information to a decoder of the translation model.

20 Claims, 16 Drawing Sheets

(51) Int. Cl.
    *G06V 30/146*     (2022.01)
    *G06V 30/148*     (2022.01)

(56) References Cited

U.S. PATENT DOCUMENTS

| | | |
|---|---|---|
| 9,436,682 B2 | 9/2016 | Mauser et al. |
| 9,836,456 B2 | 12/2017 | Cuthbert et al. |
| 9,942,473 B2 | 4/2018 | Cudak et al. |
| 10,255,278 B2 | 4/2019 | Kim et al. |
| 10,757,335 B2 | 8/2020 | Jeon |
| 2015/0370785 A1* | 12/2015 | Mauser .................. G06V 20/20 704/7 |
| 2019/0266432 A1* | 8/2019 | Lee ...................... G06V 30/153 |
| 2020/0034436 A1 | 1/2020 | Chen et al. |
| 2020/0210742 A1 | 7/2020 | Kim et al. |
| 2020/0226328 A1 | 7/2020 | Tu et al. |
| 2020/0311352 A1 | 10/2020 | Miura et al. |
| 2021/0192147 A1 | 6/2021 | Zhang et al. |

FOREIGN PATENT DOCUMENTS

| | | |
|---|---|---|
| KR | 10-2017-0010843 A | 2/2017 |
| KR | 10-2019-0008610 A | 1/2019 |

\* cited by examiner

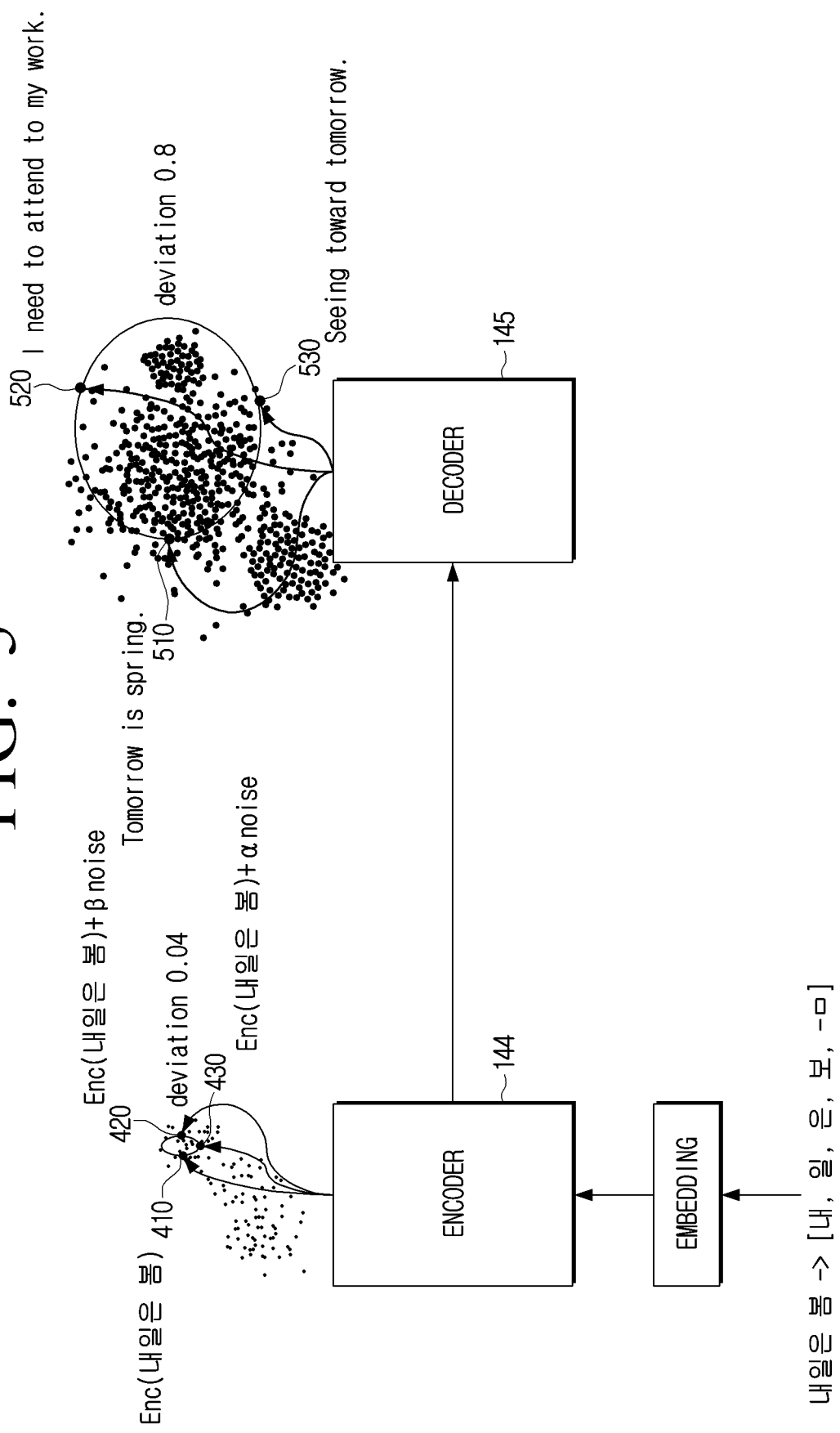

FIG. 8A

| 안 | 시 | 병 | 공 |
|---|---|---|---|
| 은 | | | 행 |
| 마 | 르 | 아 | 즈 |

ELECTRONIC DEVICE AND METHOD FOR CONTROLLING THE ELECTRONIC DEVICE THEREOF

CROSS-REFERENCE TO RELATED APPLICATION(S)

This application is a continuation application, claiming priority under § 365(c), of an International Application No. PCT/KR2021/012761, filed on Sep. 17, 2021, which is based on and claims the benefit of a Korean patent application number 10-2020-0140660, filed on Oct. 27, 2020, in the Korean Intellectual Property Office, the disclosure of which is incorporated by reference herein in its entirety.

BACKGROUND

1. Field

The disclosure relates to an electronic device and a method for controlling the electronic device. More particularly, the disclosure relates to an electronic device for translating a text included in an image obtained through a camera and a method for controlling thereof.

2. Description of Related Art

Recently, an artificial intelligence (AI) system has been used in various fields. The AI system is widely used in translating various languages.

In the related art, a method of translating by using a translation model including an encoder and a decoder has been widely used.

However, since the translation model performs translation on the basis of only a text input to the encoder, there is a problem in that it is difficult to obtain a translation text suitable for the context when the input text is a multi-sense word.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device capable of performing translation by further using additional information included in an image and a method for controlling thereof.

Additional aspects will be set forth in part in the description which follows and, in part, will be apparent from the description, or may be learned by practice of the presented embodiments.

In accordance with an aspect of the disclosure, a method of controlling an electronic device is provided. The method includes obtaining an image comprising a text through a camera, identifying an input text, among texts included in the image, to be translated, obtaining a first vector corresponding to the input text by inputting the identified input text to an encoder of a translation model, identifying whether additional information is necessary to translate the input text by inputting the first vector to a first artificial intelligence model trained to translate the input text, based on identifying that the additional information is necessary, identifying the additional information among the at least one context information by inputting the first vector and at least one context information obtained from the image to a second artificial intelligence model trained to identify the additional information, and obtaining an output text corresponding to the input text by inputting the first vector and the identified additional information to a decoder of the translation model.

In accordance with another aspect of the disclosure, the first artificial intelligence model may be trained with a first learning vector obtained by inputting learning input text to an encoder as input data and with a ratio value between a distribution range between the first learning vector and a plurality of second vectors obtained by inputting at least one first peripheral vector within a preset distribution range to the decoder, and the preset distribution range as output data.

In accordance with another aspect of the disclosure, the identifying of whether the additional information is necessary may include obtaining the ratio value corresponding to the first vector by inputting the first vector to the first artificial intelligence model, and based on the ratio value corresponding to the first vector being greater than or equal to a preset value, identifying that the additional information is necessary.

In accordance with another aspect of the disclosure, the second artificial intelligence model may perform learning with a first learning vector obtained by inputting learning input text to the encoder and learning context information corresponding to the learning input text as input data, with the learning context information and information about whether to identify the learning context information as the additional information as output data, and based on the learning context information being identified as the additional information based on the output data, the second artificial intelligence model is trained by identifying whether the first learning output text gets closer to a correct answer text by comparing first learning output text obtained by inputting the output data and the first learning vector to the decoder and second learning output text obtained by inputting only the first learning vector to the decoder.

In accordance with another aspect of the disclosure, the context information may include information about a text different from an input text included in the image and information about an object included in the image, and the identifying of the additional information may further include obtaining, from the image, information about at least one text different from the input text and information about at least one object included in the image, identifying information about a text related to the input text among information about the at least one text using the second artificial intelligence model, identifying information about an object related to the input text among information about the at least one object using the second artificial intelligence model, and identifying at least one of the information about the identified text or the information about the identified object as the additional information.

In accordance with another aspect of the disclosure, the obtaining of the information may include obtaining information about the text included in the image through an optical character reader (OCR) scheme and obtaining the information about the object by identifying the object included in the image through an object recognition scheme and analyzing the identified object.

In accordance with another aspect of the disclosure, the identifying of the information about the object related to the input text may be performed based on the information about the text related to the input text not being identified from among the information about the at least one text.

In accordance with another aspect of the disclosure, the obtaining of the output text may include obtaining a second vector corresponding to the first vector by inputting the first vector and the additional information to the decoder, and obtaining the output text based on the second vector.

In accordance with another aspect of the disclosure, the camera includes a wide-angle camera, a super wide-angle camera, and a telephoto camera, and the obtaining of the image may include obtaining the image through the wide-angle camera, and the identifying of the input text may include, based on the input text not being identified from the image obtained through the wide-angle camera, identifying the input text from the image obtained through at least one of the telephoto camera or the super wide-angle camera.

In accordance with another aspect of the disclosure, the camera may include a wide-angle camera, a super wide-angle camera, and a telephoto camera, and the obtaining of the image may include obtaining the image through the wide-angle camera, and the identifying of the additional information may include, based on the additional information not being identified from the image obtained through the wide-angle camera, identifying the additional information from an image obtained through at least one of the telephoto camera or the super wide-angle camera.

In accordance with another aspect of the disclosure, an electronic device is provided. The electronic device includes a camera, a memory storing at least one instruction, and at least one processor connected to the memory and the camera and configured to control the electronic device, and the at least one processor, by executing the at least one instruction, may obtain an image comprising a text through the camera, identify an input text, among texts included in the image, to be translated, obtain a first vector corresponding to the input text by inputting the identified input text to an encoder of a translation model, identify whether additional information is necessary to translate the input text by inputting the first vector to a first artificial intelligence model trained to translate the input text, based on identification that the additional information is necessary, identify the additional information among the at least one context information by inputting the first vector and at least one context information obtained from the image to a second artificial intelligence model trained to identify the additional information, and obtain an output text corresponding to the input text by inputting the first vector and the identified additional information to a decoder of the translation model.

In accordance with another aspect of the disclosure, the at least one processor may obtain the ratio value corresponding to the first vector by inputting the first vector to the first artificial intelligence model and based on the ratio value corresponding to the first vector being greater than or equal to a preset value, may identify that the additional information is necessary.

In accordance with another aspect of the disclosure, the context information may include information about a text different from an input text included in the image and information about an object included in the image, and the at least one processor may obtain, from the image, information about at least one text different from the input text and information about at least one object included in the image, identify information about a text related to the input text among information about the at least one text using a second artificial intelligence model, identify information about an object related to the input text among information about the at least one object using the second artificial intelligence model, and identify at least one of the information about the identified text or the information about the identified object as the additional information.

In accordance with another aspect of the disclosure, the at least one processor may obtain information about the text included in the image through an OCR scheme and obtain the information about the object by identifying the object included in the image through an object recognition scheme and analyzing the identified object.

In accordance with another aspect of the disclosure, the at least one processor may identify the information about the object related to the input text based on the information about the text related to the input text not being identified from among the information about the at least one text.

In accordance with another aspect of the disclosure, the at least one processor may obtain a second vector corresponding to the first vector by inputting the first vector and the additional information to the decoder and obtain the output text based on the second vector.

In accordance with another aspect of the disclosure, the camera includes a wide-angle camera, a super wide-angle camera, and a telephoto camera, and the obtaining of the image may include obtaining the image through the wide-angle camera, and based on the input text not being identified from the image obtained through the wide-angle camera, the input text from the image obtained through at least one of the telephoto camera or the super wide-angle camera may be identified.

In accordance with another aspect of the disclosure, the camera may include a wide-angle camera, a super wide-angle camera, and a telephoto camera, and the obtaining of the image may include obtaining the image through the wide-angle camera, and the identifying of the additional information may include, based on the additional information not being identified from the image obtained through the wide-angle camera, identifying the additional information from an image obtained through at least one of the telephoto camera or the super wide-angle camera.

In accordance with another aspect of the disclosure, the electronic device may improve accuracy of translation by performing translation by further using additional information in an image including an input text, along with an input text.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a diagram illustrating a first vector in a decoder output vector and a second vector corresponding to a first peripheral vector according to an embodiment of the disclosure;

FIG. 8A is a diagram illustrating an image obtained through a wide-angle mode of a camera according to an embodiment of the disclosure;

FIG. 8B is a diagram illustrating an image obtained through a super wide-angle mode of a camera according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
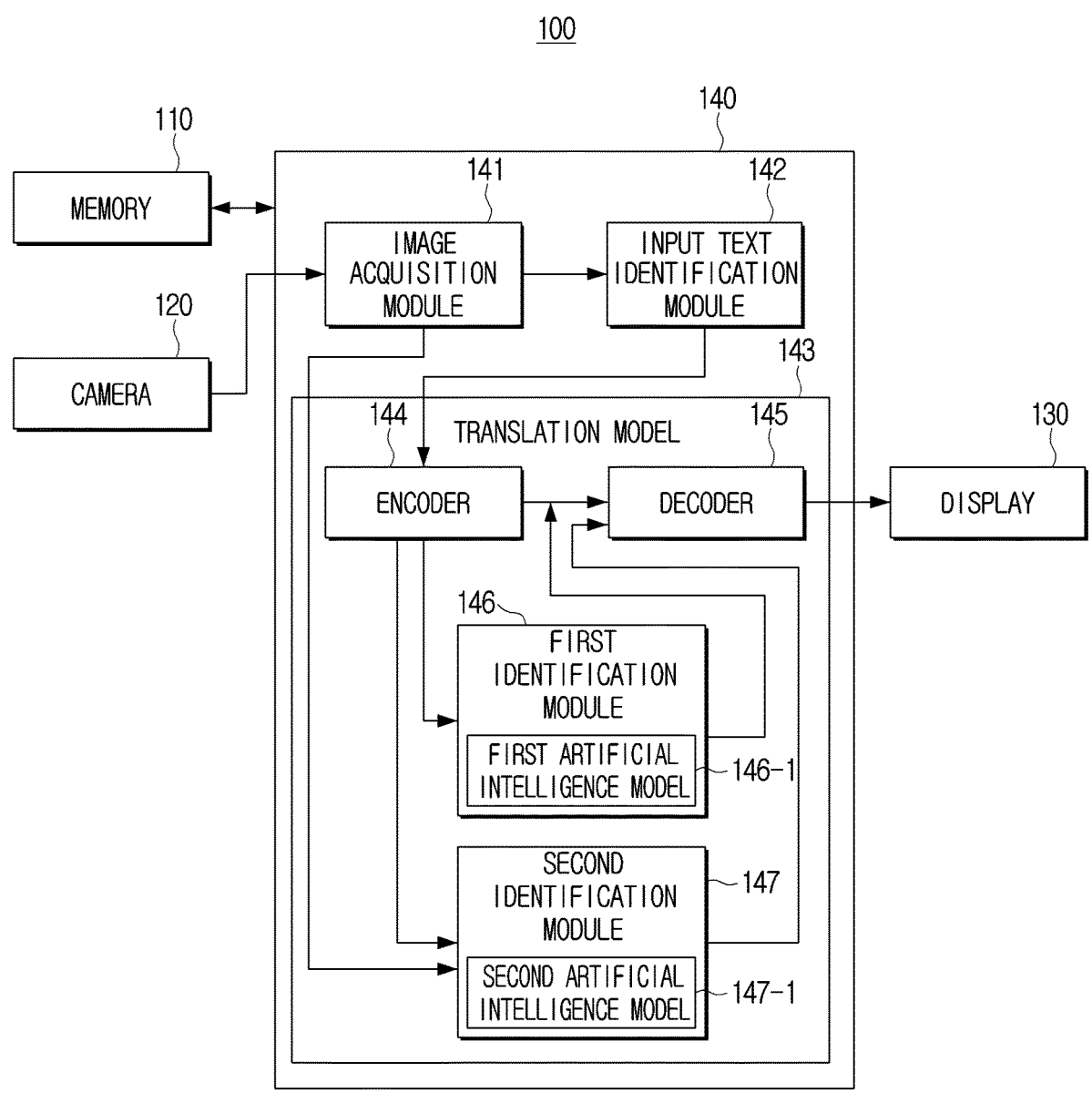
FIG. 1 is a block diagram illustrating a configuration of an electronic device according to an embodiment of the disclosure.

FIG. 1 is a block diagram illustrating a configuration of an electronic device according to an embodiment of the disclosure.

Referring to FIG. 1, an electronic device 100 may include a memory 110, a camera 120, a display 130, and at least one processor 140. According to the disclosure, the electronic device 100 may be implemented as various types of electronic devices such as a smart phone, an artificial reality (AR) glass, a tablet personal computer (PC), a mobile phone, an image telephone, an electronic book reader, a TV, a desktop PC, a laptop PC, a netbook computer, a workstation, a camera, a smart watch, and the like.

The memory 110 may store various programs and data necessary for operation of the electronic device 100. Specifically, at least one instruction may be stored in the memory 110. The at least one processor 140 may perform an operation of the electronic device 100 by executing instructions stored in the memory 110.

The memory 110 may be implemented as a non-volatile memory, a volatile memory, a flash memory, a hard disk drive (HDD), a solid state drive (SSD), or the like. The memory 110 is accessed by the processor 120 and reading/writing/modifying/deleting/updating of data by the processor 120 may be performed. In the disclosure, the term memory may include the memory 110, read-only memory (ROM) in the processor 120, random access memory (RAM), or a memory card (for example, a micro secure digital (SD) card, and a memory stick) mounted to the electronic device 100. The memory 110 may store a program, data, or the like, to configuration various screens to be displayed on the display area of the display.

The camera 120 is disposed on one side of the electronic device 100 to obtain an image including text. The electronic device 100 may obtain an image including text by capturing an image displayed on the display 130 through the camera 120. However, the electronic device 100 is not limited thereto and may analyze an image displayed on the display 130 through the camera 120 in real time, and if it is identified that the image includes text, may obtain an image including the corresponding text.

According to the disclosure, the camera 120 may be composed of one lens, but is not limited thereto, and may be a stereo camera including a plurality of lenses. For example, when the camera 120 includes a plurality of lenses, the camera 120 may include a wide-angle lens, a super wide-angle lens, and a telephoto lens. The electronic device 100 may obtain an image including text in a wide-angle mode using the wide-angle lens of the camera 120, but is not limited thereto, and may obtain an image including text by further using a wide-angle lens and a telephoto lens. The details of obtaining an image including text using a plurality of lenses will be described later with reference to the following figures.

The display 130 may display various information under the control of the at least one processor 140. If the camera 120 is running, the display 130 may display an image provided by the camera. The display 130 may display the translated text provided by a translation function according to the disclosure.

The display 130 may be implemented in various types of displays, such as a liquid crystal display panel (LCD), a light emitting diode (LED), organic light emitting diodes (OLED), liquid crystal on silicon (LCoS), digital light processing (DLP), etc. In addition, a driving circuit, a backlight unit, etc. may be included in the display 130 in a form such as amorphous silicon (a-si) thin film transistor (TFT), a low temperature poly silicon (LTPS) TFT, an organic TFT (OTFT), or the like.

The display 130 may be combined with a touch sensor to be implemented as a touch screen.

The at least one processor 140 may be electrically connected with the memory 110 and may control overall operations and functions of the electronic device 100. The at least one processor 140 may be configured with one or a plurality of processors. At this time, one or a plurality of processors may be a general purpose processor, such as a central processing unit (CPU), an application processor (AP), or the like, a graphics-only processor such as graphics processing unit (GPU), visual processing unit (VPU), or the like, or an artificial intelligence (AI)-dedicated processor such as neural network processing unit (NPU).

The one or a plurality of processors control the processing of the input data according to a predefined operating rule or AI model stored in the memory 110. The predefined operating rule or AI model is made through learning. Here, that the AI model is made through learning may refer that the learning algorithm is applied to a plurality of learning data, so that a predefined operating rule or AI model of a desired characteristic is generated. The learning of the AI model may be performed in a device itself in which AI according to the disclosure is performed, and may be implemented through a separate server/system.

The AI model may include a plurality of neural network layers. Each layer has a plurality of weight values, and performs a layer operation through a result of calculation of a previous layer and an operation of a plurality of weights. Examples of neural networks include, but are not limited to, a convolutional neural network (CNN), a deep neural network (DNN), a recurrent neural network (RNN), a Restricted Boltzmann Machine (RBM), a Deep Belief Network (DBN), a Bidirectional Recurrent Deep Neural Network (BRDNN), and a Deep Q-Network, and the neural network in the disclosure is not limited to the above-described examples.

The at least one processor 140 may drive an operating system or application program to control hardware or software components connected to the at least one processor 140, and perform various data processing and operations. The at least one processor 140 may also load instructions or data received from at least one of the other components into a volatile memory and store the various data in a non-volatile memory.

The at least one processor 140 may provide a translation function for performing translation for text included in the image obtained through the camera 120. The translation function may include an image acquisition module 141, an input text identification module 142, a translation model 143, an encoder 144, a decoder 145, a first identification module 146, and a second identification module 147, as illustrated in FIG. 1, and each module may be stored in the memory 110.

When the translation function is executed, a plurality of modules 141 to 147 may be loaded into a memory (e.g., a volatile memory) included in the at least one processor 140. When the translation function is executed, the at least one processor 140 may load the plurality of modules 141 to 147 into the volatile memory from the non-volatile memory to execute respective functions of the plurality of modules 141 to 147. Loading refers to an operation of retrieving and storing the data stored in the non-volatile memory in the volatile memory so that the at least one processor 140 may access the data.

According to an embodiment, as illustrated in FIG. 1, a translation function may be implemented through a plurality of modules 141 to 147 stored in the memory 110, but the embodiment is not limited thereto and the translation function may be implemented in an external server.

The plurality of modules 141 to 147 according to the disclosure may be implemented with respective software, but some modules may be implemented in a combination of hardware and software. According to still another embodiment, the plurality of modules 141 to 147 may be implemented with one software. Some modules may be implemented within the electronic device 100, and some other modules may be implemented in an external server.

The image acquisition module 141 is configured to obtain an image from the camera 120 and obtain text from the obtained image.

According to an embodiment, the image acquisition module 141 may obtain an image including a text by capturing an image displayed on the display 130 through the camera 120.

In another embodiment, the image acquisition module 141 may analyze the image displayed on the display 130 through the camera 120 in real time and obtain an image including the corresponding text when the image is identified as including the text.

The image acquisition module 141 may obtain text included in the image. The image acquisition module 141 may analyze an image obtained through the camera 120 through an optical character reader (OCR) to obtain text included in the image. However, the embodiment is not limited thereto, and may obtain text from an image by various methods, such as using an AI model for detecting text from an image.

When the camera 120 is implemented as a stereo camera including a plurality of lenses, the image acquisition module 141 may obtain text from an image obtained by using a wide-angle mode using the wide-angle lens of the camera 120.

However, if it is not possible to identify the text from the image obtained using the wide-angle mode, the text may be obtained from the obtained image using the super wide-angle mode and the telephoto mode using the telephoto lens. The detailed description will be described later with reference to the following figures.

The input text identification module 142 is configured to identify the input text among the at least one text obtained in the image. The input text is text for which the user wishes to perform translation and is a text input to the encoder 144 of the translation model 143.

When at least one text included in the image is obtained through the image acquisition module 141, the input text identification module 142 may identify the input text to be input to the translation model 143 among the at least one text.

According to one embodiment, the input text identification module 142 may identify a text selected through a user input among at least one text included in the image as an input text. The user input may include various user inputs, such as a user input for dragging text, a user input for selecting text, a user voice input for uttering text, or the like.

According to another embodiment, the input text identification module 142 may automatically identify the input text to be translated among the at least one text included in the image. For example, the input text identification module 142 may identify an input text to be translated based on at least one of a position, a text size, or a font of each of a plurality of texts included in the image.

Once the input text is identified through the input text identification module 142, the identified input text may be input to the encoder 144 of the translation model 143. The translation model 143 according to the disclosure may include an encoder 144, a decoder 145, a first identification module 146, and a second identification module 147. The encoder 144 and the decoder 145 among the translation model 143 according to the disclosure may be implemented as a neural machine translation (NMT) model.

The encoder 144 of the translation model 143 includes a plurality of layers and is configured to output a vector corresponding to the input text through the plurality of layers. The encoder 144 may receive the input text to output a first vector corresponding to the input text, that is, the first vector refers to a vector output from the encoder 144.

A plurality of first vectors corresponding to each of the plurality of input text may be output through the encoder 144, and the outputted plurality of first vectors may form an encoder output distribution corresponding to each vector value. That is, when the two input texts are similar to each other, the two first vectors corresponding to the two input texts may be located at a close distance within the encoder output distribution.

The first vector output through the encoder 144 may be input to the decoder 145 and the output text corresponding to the input text may be obtained.

The decoder 145 of the translation model 143 is configured to include a plurality of layers, decode the vectorized first vector through the plurality of layers to obtain a second vector, convert the second vector into a text format, and the second vector refers to a vector obtained through the decoder 145.

The decoder 145 may receive the first vector output from the encoder 144 and obtain a second vector corresponding to the input text. A plurality of second vectors corresponding to each of the plurality of first vectors may be obtained through the decoder 145, and the plurality of second vectors may also form a decoder output distribution corresponding to each vector value.

The decoder 145 may obtain an output text corresponding to the input text based on the second vector. The decoder 145 may obtain a second vector corresponding to a first word of the output text, a second vector corresponding to the second word, and second vectors corresponding to the last word, and the output text may be identified through the obtained plurality of second vectors. This decoding process will be described later with reference to FIGS. 7A to 7D.

When the input text includes multi-sense words, the translation model 143 may recognize a context of the corresponding input text through the entire input text, and output an output text suitable for the context. For example, in the input text of "은행을 먹는다 " the translation model 143 may identify the context of the input text through the word "먹는다 " and translate the "은행 " to "ginkgo fruits."

In the input text "은행은 몇 시에 문을 여나요 ?," the translation model 143 may grasp the context of the input text through the words "몇 시 " and "문을 열다 " and may translate "은행 " as "bank."

However, if the translation model 143 is unable to grasp the context of the input text, the translation model 143 may perform translation into words that are not matched with the context of the input text included in the image. The translation function according to the disclosure may grasp the context of the input text by obtaining additional information for translating the input text from the image through the first identification module 146 and the second identification module 147, thereby providing translation text corresponding to the context of the input text.

The first identification module 146 is for identifying whether additional information for translating the input text input to the encoder 144 is required. The additional information means information related to the input text among the context included in the image, and the context may include texts which are different from the input texts among the texts included in the image and the objects included in the image.

The first identification module 146 may identify whether additional information for translating the input text is needed by inputting the first vector which is obtained by inputting the input text to the encoder 144 to a first AI model 146-1.

The first AI model 146-1 is a model to output information about whether the input text requires additional information by using the first vector corresponding to the input text.

The first AI model 146-1 may input the trained input text to the encoder 144 to perform learning with the obtained first learning vector as the input data. The learning may be performed with a ratio value between the distribution range among a plurality of second vectors within the decoder output distribution obtained by inputting, to the decoder 145, each of the first learning vector and at least one peripheral vector within a preset distribution range (e.g., within deviation 0.04) from the first learning vector, and a preset distribution range between the first learning vector and the first peripheral vector within the encoder output distribution, as output data. The first peripheral vectors within the preset distribution range may be vectors located within a predetermined deviation with the first learning vector within the encoder output distribution. According to an embodiment, when the number of first peripheral vectors is one, the first peripheral vector may be located within a predetermined distance from the first learning vector within the encoder output distribution. At least one first vector within the preset distribution range with the first learning vector which is obtained by inputting the learning input text to the encoder 144 may be identified as the first peripheral vector.

According to an embodiment, when noise is added to the first learning vector, a first vector within a preset distribution range with the first learning vector may be identified as a first peripheral vector. However, the embodiment is not limited thereto and if noise is added to the first learning vector, a new first vector may be generated within a preset distribution range with the first learning vector, and the generated first vector may be identified as the first peripheral vector.

According to still another embodiment, at least one first vector obtained by inputting at least one similar learning text similar to the learning text may be identified as a first peripheral vector. For example, if the learning text is "내일은 봄 " two first vectors obtained by inputting "내일을 봄" and "내 일 좀 봐아해" which are similar to the learning text to the encoder 144 may be identified as the first peripheral vector.

According to another embodiment, one of a plurality of first vectors located within a predetermined distribution range within an output distribution of the encoder 144 without using a learning text may be identified as a first learning vector, and the remaining first vector may be identified as a first peripheral vector.

Each of the first learning vector and the at least one first peripheral vector may be input to the decoder 145 to obtain a plurality of second vectors. The distribution range between a plurality of second vectors within the output decoder distribution may be obtained, and a ratio value between a distribution range between second vectors obtained in the decoder output distribution and a predetermined distribution range between the first learning vector and the first peripheral vector within the encoder output distribution may be calculated. The learning for the first AI model 146-1 may be performed using the calculated ratio value as the output data of the first AI model 146-1.

The first identification module 146 may obtain the ratio value corresponding to the first vector by inputting the first vector corresponding to the input text to the trained first AI model 146-1.

If the obtained ratio value is less than the preset value (e.g., 10), the first identification module 146 may identify that additional information is not needed to translate the input text. If it is identified that additional information is not necessary, the translation model 143 may input the first vector to the decoder 145 to obtain an output text corresponding to the input text.

If the obtained ratio value is greater than or equal to a predetermined value (e.g., 10), the first identification module 146 may identify that additional information is needed to translate the input text. If additional information is identified as needed, the translation model 143 may use the second identification module 147 to obtain additional information.

The second identification module 147 is configured to identify additional information related to the input text among at least one context included in the image.

If the input text is identified as needed through the first identification module 146, the second identification module 147 may obtain the context from the image obtained through the camera 120. The text may be obtained by analyzing an image through an OCR method, and the object may be obtained through an object recognition scheme in an image.

The second identification module 147 may input the obtained context information and the first vector corresponding to the input text into a second AI model 147-1 to identify additional information related to the input text. The context information may be information obtained by vectorizing the context obtained in the image. The context information may be information in which context obtained from the image is converted to be input into the second AI model 147-1 and the decoder 145.

When the first vector corresponding to the input text and the context information are input to the second identification module 147-1, whether the input context information is related to the input text may be identified. If it is identified that the context information is related to the input text, the second identification module 147 may identify the corresponding context information as additional information.

The second AI model 147-1 is a model to perform learning through the learning input text and learning context information corresponding to the learning input text, and identify whether to use the learning context information as additional information about the learning input text.

The second AI model 147-1 may perform learning using learning context information corresponding to the first learning vector and the learning input text obtained by inputting the learning input text to the encoder 144 as input data. The second AI model 147-1 may perform learning with learning context information input to the second AI model 147-1 and identification information about whether to identify the corresponding learning context information as additional information as output data.

For example, if the learning context information input to the second AI model 147-1 is identified as additional information, the second AI model 147-1 may output information that the corresponding learning context information will be identified as additional information along with the learning context information. If the learning context information input to the second AI model 147-1 is not identified as additional information, the second AI model 147-1 may output information that the corresponding learning context information will not be identified as additional information, together with the learning context information.

If the learning context information input to the second AI model 147-1 is identified as additional information, the output data of the second AI model 147-1 may be identified as additional information. That is, the learning context information and information that the corresponding learning context information will be identified as the additional information may be identified as additional information.

The first learning output text may be obtained by inputting the additional information and the first learning vector to the decoder 145.

The second learning output text may be obtained by inputting only the first learning vector to the decoder 145.

The second AI model 147-1 may be trained by comparing the first learning output text with the second learning output text to identify whether the first learning text is closer to the correct answer output text as compared to the second learning output text, and evaluating the output data of the second AI model 147-1.

For example, the learning input text is "방어 구이" and the correct answer output text is "yellow tail fry." In this example, when the learning context is "fish fry," the second AI model 147-1 may identify that the learning context information of "fish fry" as additional information of "방어 구이" and if the first learning output text "fried yellow tail" and second learning output text "fried defense" are obtained, the first learning output text "fried yellow tail" gets closer to the correct answer output text "yellow tail fry" than the second learning output text "fried defense" and a reward may be assigned to the second AI model 147-1 which identifies that the learning context information for "fish fry" is additional information about "방어 구이" and learning of the second AI model 147-1 may be performed. If the first learning output text does not get closer to the correct answer output text as compared to the second learning output text, a penalty may be assigned to the second AI model 147-1 and learning of the second AI model 147-1 may be performed.

The second identification module 147 may input the first vector and the context information corresponding to the input text to the trained second AI model 147-1 to obtain the context information and identification information on whether to identify the context information as additional information. If the obtained identification information is information that the corresponding learning context information will be identified as additional information, the second identification module 147 may identify the corresponding context information as additional information.

If additional information is identified through the second identification module 147, the decoder 145 may receive additional information together with the first vector output from the encoder 144 to obtain an output text corresponding to the input text. The decoder 145 may receive a vector in which the first vector and the additional information are weight-coupled, obtain a second vector, and may obtain an output text based on the second vector. However, the embodiment is not limited thereto, and in the process of converting the second vector output from the decoder 145 into the output text, the second vector is weight-coupled with the additional information, and the output text may be obtained on the basis of the weight-coupled vector. The contents that the first vector or the second vector are combined with the additional information will be described later with reference to FIGS. 7A to 7D.

The decoder of the related-art translation model receives only the first vector output from the encoder and obtains the output text. Accordingly, according to the disclosure, the decoder 145 of the translation model 143 may obtain the output text by further using the additional information together with the first vector output from the encoder 144, unlike a related-art decoder.

Through the above embodiments, the electronic device 100 may improve accuracy of translation by translation by further using additional information in an image which includes the input text, along with the input text. For example, by translating an input text including multi-sense word to correspond to a context, accuracy and reliability of translation may be improved.

Figure 2:
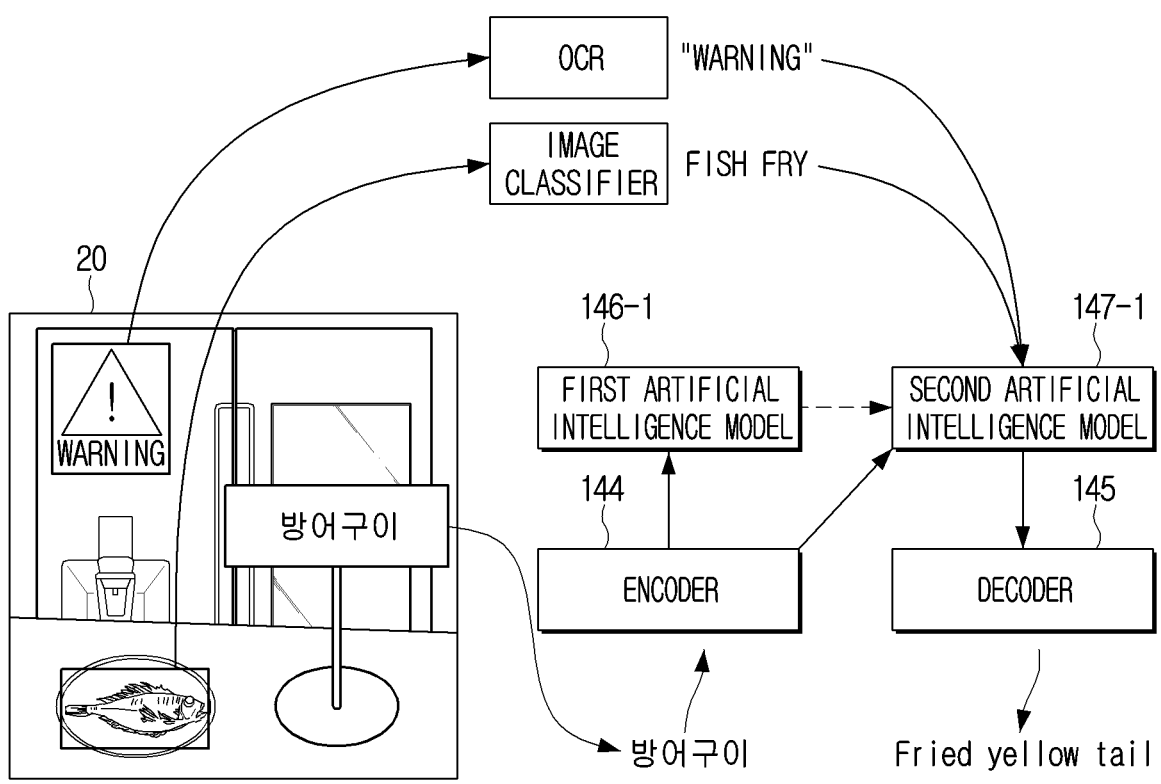
FIG. 2 is a diagram illustrating a method of performing translation for input text by identifying input text and additional information in an image according to an embodiment of the disclosure.

FIG. 2 is a diagram illustrating a method of performing translation for input text by identifying input text and additional information in an image according to an embodiment of the disclosure.

Referring to FIG. 2, the electronic device 100 according to the disclosure may obtain an image 20 including text using the camera 120. When the image 20 is obtained, the electronic device 100 may obtain text included in the image 20. As an example, the electronic device 100 may obtain "방어 구이" and "WARNING" text through the OCR scheme from the image 20.

When text is obtained from the image 20, the electronic device 100 may identify the input text for performing translation among the obtained text. According to one embodiment, the electronic device 100 may identify a text selected through a user input among at least one text included in the image as an input text. The user input may include various user inputs, such as a user input for dragging text, a user input for selecting text, a user voice input for uttering text, or the like.

According to another embodiment, the electronic device 100 may automatically identify an input text to be translated among at least one text included in the image. For example, the electronic device 100 may identify an input text to be translated based on at least one of a position, a text size, or a font of each of a plurality of texts included in an image.

If the input text is identified to be "방어구이" in the image 20 of FIG. 2, the electronic device 100 may input the input text "방어구이" to the encoder 144 to obtain a first vector corresponding to the input text. Specifically, the electronic device 100 may embed the input text "방어구이" and may input vectorized information into the encoder 144.

When the first vector is obtained through the encoder 144, the electronic device 100 may input the first vector to the first AI model 146-1 to identify whether additional information is needed to translate the input text.

For example, if it is identified that additional information is not required to translate the input text through the first AI model 146-1, the electronic device 100 may input a first vector corresponding to the input text to the decoder 145 to obtain an output text corresponding to the input text.

In one embodiment, if additional information is identified as needed to translate the input text through the first AI model 146-1, the electronic device 100 may obtain context information from the image 20.

Specifically, the electronic device 100 may obtain a context from the image 20 obtained through the camera 120. The text may be obtained by analyzing an image through an OCR method, and the object may be obtained through an object recognition scheme from an image. The electronic device 100 may obtain "WARNING" context, which is a text different from the input text through an OCR scheme in the image 20, and may obtain a "fish fry" context through an object recognition method in the image 20.

When the context is obtained in the image 20, the electronic device 100 may input the first vector corresponding to the input text with the vectorized context information into the second AI model 147-1 to identify additional information related to the input text among the context information. Specifically, when the first vector corresponding to the context information and the input text is input to the second AI model 147-1, it may be identified whether the inputted context information is associated with the input text.

If additional information is identified through the second AI model 147-1, the electronic device 100 may input the first vector corresponding to the additionally identified context information and the input text to the decoder 145 to obtain an output text, fried yellow tail, corresponding to the input text.

Through the embodiment above, the electronic device 100 may translate the input text including multi-sense words to match the context, thereby improving accuracy and reliability of translation.

Figure 3:
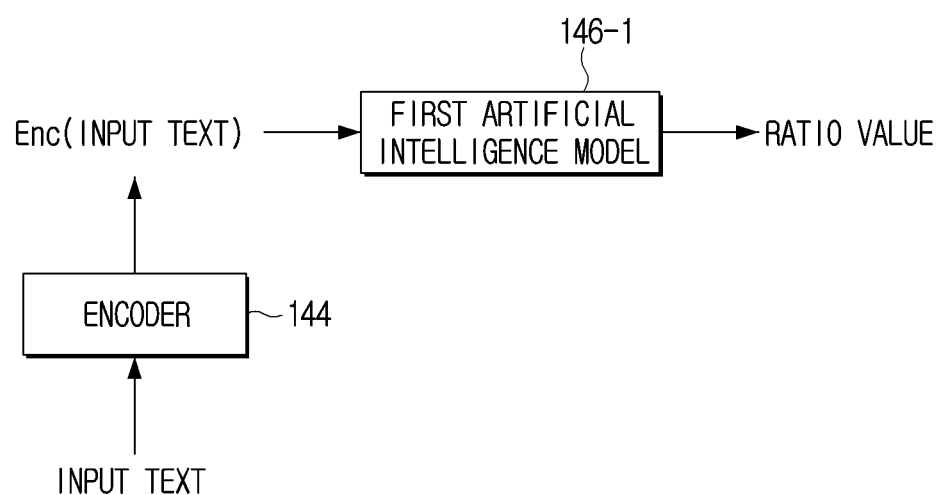
FIG. 3 is a diagram illustrating a method of identifying whether additional information for translating an input text is required by using a first artificial intelligence model according to an embodiment of the disclosure.

FIG. 3 is a diagram illustrating a method of identifying whether additional information for translating an input text is required by using a first artificial intelligence model according to an embodiment of the disclosure.

As described above in FIG. 2, the electronic device 100 may input the input text to the encoder 144 to obtain a first vector Enc (input text) corresponding to the input text.

Referring to FIG. 3, the electronic device 100 may input the first vector to the first AI model 146-1 to obtain a ratio value corresponding to the first vector. When the first vector is input, the first AI model 146-1 is an AI model trained to obtain a ratio value corresponding to the first vector, and the learning method of the first AI model 146-1 will be described later with reference to FIGS. 4A, 4B, and 5.

The ratio value may be a ratio value for a preset distribution range value between a first vector in the encoder output distribution and a first peripheral vector corresponding to the first vector and a distribution range between the first vector in the decoder output distribution and the second vector corresponding to the first vector. For example, if a predetermined distribution range value between a first vector and a first peripheral vector corresponding to the first vector is 0.03, and a distribution range value between a first vector and a second vector corresponding to the first vector is 0.8, the ratio value may be calculated as 0.8/0.03=26.67. The greater the ratio value, the greater the distribution range between the second vectors in the decoder output distribution relative to the preset distribution range within the encoder output distribution, and the higher the ambiguity and polysemy of the input text corresponding to the first vector.

If the ratio value obtained through the first AI model 146-1 is less than a predetermined value (e.g., 10), the electronic device 100 may identify that additional information is not needed to translate the input text. If it is identified that additional information is not required, the electronic device 100 may input the first vector to the decoder 145 to obtain an output text corresponding to the input text.

If the obtained ratio value is greater than or equal to a predetermined value (e.g., 10), the electronic device 100 may identify that additional information is needed to translate the input text. If additional information is identified as needed, the electronic device 100 may obtain additional information from the image obtained through the camera, as shown in FIG. 2.

Figure 4A:
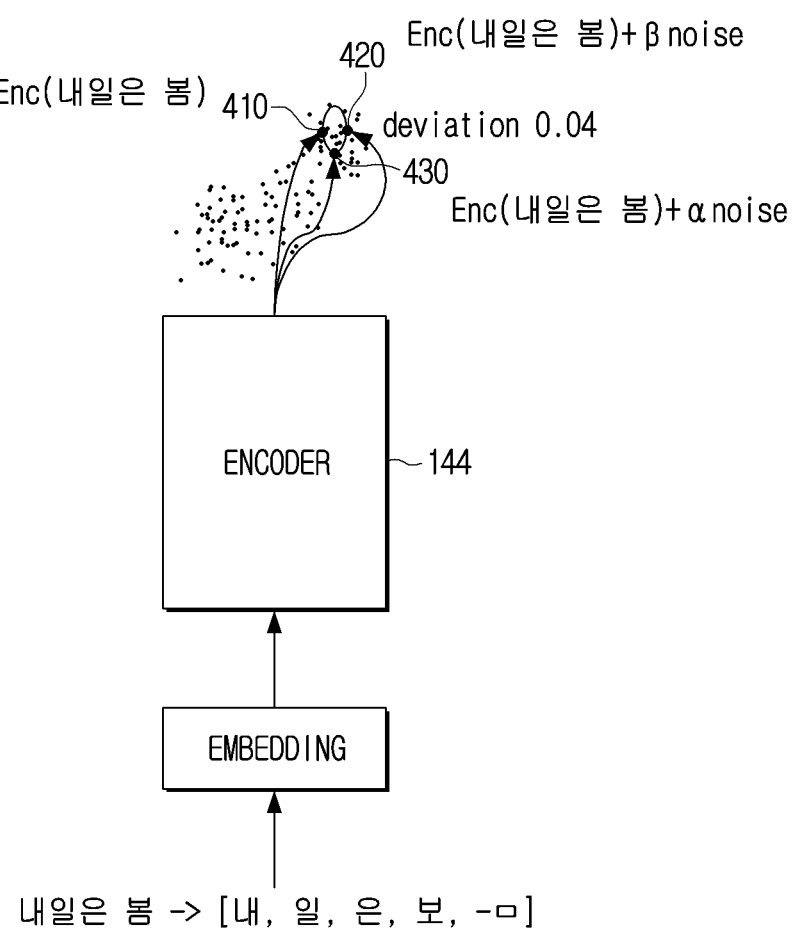
FIG. 4A is a diagram illustrating a first vector and a first peripheral vector in an encoder output distribution according to an embodiment of the disclosure.

FIG. 4A is a diagram illustrating a first vector and a first peripheral vector in an encoder output distribution according to an embodiment of the disclosure.

Referring to FIG. 4A, the electronic device 100 may input the input text (내일은 봄) to the encoder 144 to obtain a first vector 410 corresponding to the input text. The electronic device 100 may embed the input text and input the vectorized information to the encoder 144 to obtain the first vector 410 corresponding to the input text.

The electronic device 100 may obtain first peripheral vectors 420 and 430 within the predetermined distribution range (e.g., within the deviation 0.04) from the first vector 410, by adding noise (α, β) to the first vector 410 corresponding to the input text.

For example, if the noise (α, β) is added to the first vector 410, the first vector within the preset distribution range with the first vector 410 within the encoder output distribution may be identified as the first peripheral vectors 420 and 430.

According to an embodiment, when a noise (α, β) is added to the first vector 410, a new first vector is generated within the preset distribution range from the first learning vector, and the generated first vector may be identified as the first peripheral vector 420 and 430.

The electronic device 100 may obtain the distribution range (e.g., deviation 0.04) between the first vector 410 and the first peripheral vectors 420 and 430.

Figure 4B:
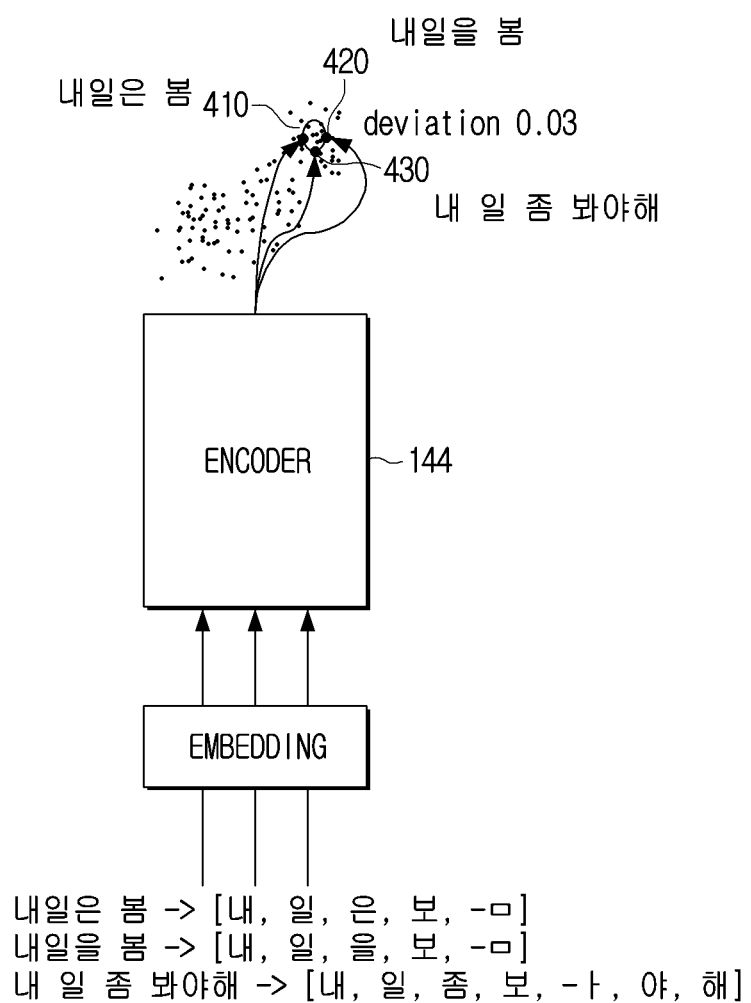
FIG. 4B is another diagram illustrating a first vector and a first peripheral vector in an encoder output distribution according to an embodiment of the disclosure.

FIG. 4B is another diagram illustrating a first vector and a first peripheral vector in an encoder output distribution according to an embodiment of the disclosure.

Referring to FIG. 4B, the electronic device 100 may obtain the first vector 410 and the first peripheral vector 420 and 430 corresponding to the input text and the similar learning text by inputting a plurality of similar learning texts (including 내일은, 봄, 내일 꼭 와야해) similar to the input text and the input text (내일은 봄) to the encoder 144. Specifically, the electronic device 100 may embed the input text and the similar learning text and input the vectorized information to the encoder 144 to obtain the first vector 410 corresponding to the input text and the first peripheral vectors 420 and 430 corresponding to the similar learning text.

The electronic device 100 may obtain the distribution range between the first vector 410 and the first peripheral vectors 420 and 430 within the encoder output distribution.

FIG. 5 is a diagram illustrating a first vector in a decoder output vector and a second vector corresponding to a first peripheral vector according to an embodiment of the disclosure.

Referring to FIGS. 4A and 4B, when the first vector 410 and the first peripheral vectors 420 and 430 are identified, the electronic device 100 may input the first vector 410 and the first peripheral vector 420 and 430 to the decoder 145 to identify a second vector 510 corresponding to the first vector 410 and second vectors 520 and 530 corresponding to the first peripheral vector 420 and 430 within the decoder output distribution. The second vector 510 corresponding to the first vector 410 may be the second vector 510 corresponding to a text (tomorrow is spring) which is translation of the input text (내일은 봄). The second vectors 520 and 530 corresponding to the first peripheral vectors 420 and 430 may be second vectors 520 and 530 corresponding to a text ("I need to attend to my work," "Seeing toward tomorrow") translated by adding noise based on the input text (내일은 봄).

Referring to FIG. 5, the electronic device 100 may obtain a distribution range between the second vectors 510, 520, and 530. Once the distribution range is obtained, the electronic device 100 may obtain a ratio value between the distribution range between the first vector 410 and the first peripheral vector 420 and 430 within the encoder output distribution and the distribution range between the second vectors 510, 520, and 530 in the decoder output distribution.

The electronic device 100 may perform learning for the first artificial intelligence model 146-1 with the first vector 410 corresponding to the input text as the input data of the first AI model 146-1 and with a ratio value between a distribution range between the first vector 410 and a plurality of first peripheral vectors 420 and 430 within a preset distribution range, and the preset distribution range between the second vectors 510, 520, and 530 within the decoder output distribution as output data.

In the embodiment described above, the first peripheral vector is two or more, but the disclosure is not limited thereto. When the number of the first peripheral vectors is one, learning for the first AI model 146-1 may be performed using a ratio value of a distance between the first peripheral vector and the first vector and a distance between second vectors obtained by inputting the first peripheral vector and the first vector to the decoder 145.

Referring to FIGS. 3, 4A, 4B, and 5, learning of the first AI model 146-1 is performed by the electronic device 100, but the embodiment is not limited thereto. That is, the first AI model 146-1 may be trained through an external server, and the electronic device 100 may receive the trained first AI model 146-1 from an external server.

Although FIG. 5 shows that the second vector corresponding to the output text is one vector, the disclosure is not limited thereto. The second vector corresponding to the first word of the output text, the second vector corresponding to the second word of the output text, and the second vectors corresponding to the last word of the output text are output from the decoder 145, respectively, and the electronic device 100 may obtain the output text using the plurality of output second vectors. This will be described later in detail with reference to FIGS. 7A to 7D.

Figure 6:
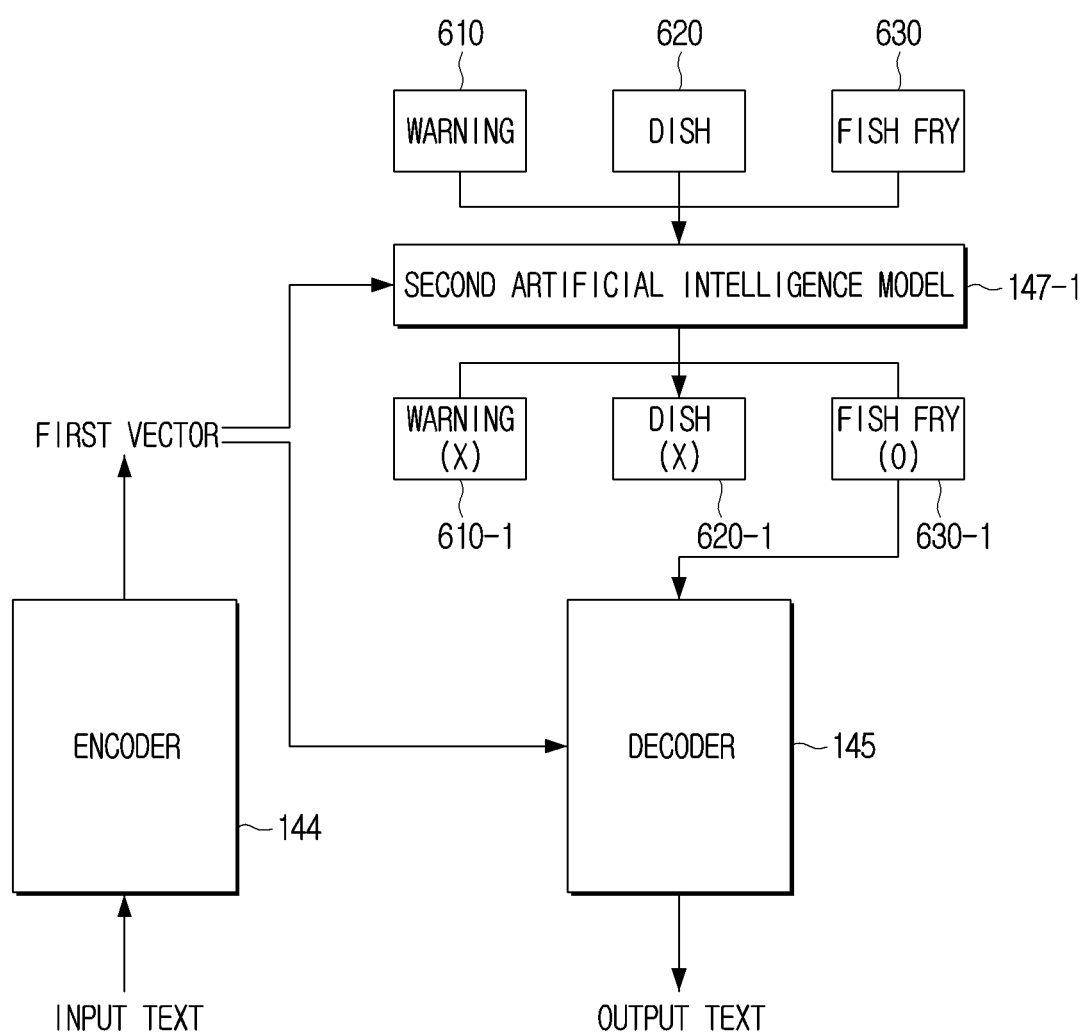
FIG. 6 is a diagram illustrating a method of identifying additional information in an image using a second artificial intelligence model, according to an embodiment of the disclosure.

FIG. 6 is a diagram illustrating a method of identifying additional information in an image using a second artificial intelligence model, according to an embodiment of the disclosure.

As described above with reference to the drawings, if additional information is identified as needed to translate the input text through the first AI model 146-1, the electronic device 100 may obtain additional information from the image using the second AI model 147-1.

According to an embodiment, the electronic device 100 may obtain context information on the image 20 of FIG. 2 with respect to the "warning," "dish," and the "fish fry" in the image 20 of FIG. 2. The electronic device 100 may analyze the text included in the image 20 through an OCR scheme to obtain a "Warning" context, and may vectorize to input "warning" context to the second AI model 147-1 and may obtain context information 610 for "warning." The electronic device 100 may obtain "dish" and "fish fry" context through the object recognition from the image 20 and vectorize the context "dish" and "fish fry" context to input to the second ARI model 147-1 and may obtain context information 620 for the "dish" and context information 630 for the "fish fry."

Referring to FIG. 6, when the context information 610, 620, and 630 is obtained, the electronic device 100 may input the obtained plurality of context information 610, 620, and 630 to the second AI model 147-1 to obtain identification information 610-1 and 620-1, and 630-1 to identify the context information as additional information. The identification information on whether to identify the context information as additional information may include information about whether the context information input to the second AI model 147-1 and the inputted context information are identified as additional information (O, X).

If the context information 630 for the "fish fry" is input to the second AI model 147-1, information 630-1 that the context information about "fish fry" will be additionally identified as additional information may be obtained, and the context information 620 for the "dish" is input to the second AI model 147-1, the information 620-1 that the context information about "dish" will not be identified as additional information may be obtained. If the context information 610 for the "warning" is input to the second AI model 147-1, the information 610-1 that the context information for "warning" may not be obtained as additional information may be obtained.

The electronic device 100 may input information 630-1 that the context information about "fish fry" which is identified as additional information among identification information 610-1, 620-1, and 630-1 as additional information to the decoder 145 along with the first vector to obtain output text corresponding to the input text.

Figure 7A:
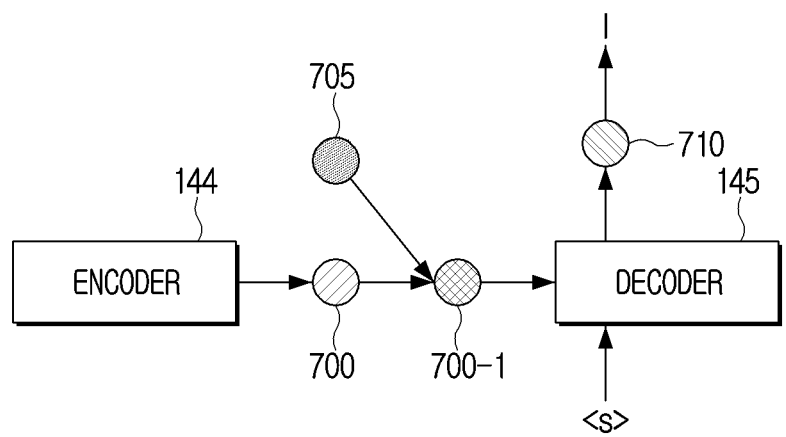
FIG. 7A is a diagram illustrating a first step of a decoding step of obtaining output text using a first vector to which additional information is reflected, according to an embodiment of the disclosure.
Figure 7B:
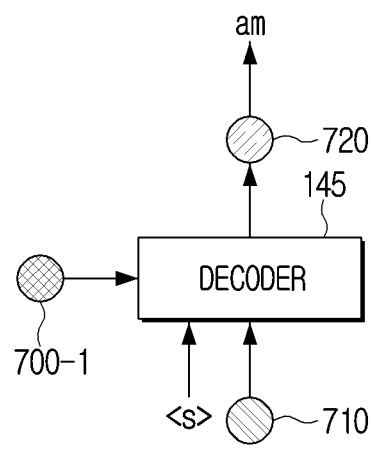
FIG. 7B is a diagram illustrating a second step of a second decoding step of obtaining output text using a first vector in which additional information is reflected according to an embodiment of the disclosure.

FIGS. 7A and 7B are diagrams illustrating a decoding step of obtaining output text using a first vector to which additional information is reflected, according to various embodiments of the disclosure.

Referring to FIG. 7A, the electronic device 100 may obtain a first vector 700 corresponding to the input text through the encoder 144 and obtain additional information 705 through the second AI model 147-1. The electronic device 100 may obtain a first vector 700-1 in which additional information 705 is reflected from first vector 700 by applying weights to each of the first vector 700 and the additional information 705. For example, the weight of the first vector 700 may be higher than the weight of the additional information.

The electronic device 100 may obtain output text by inputting the 1-1 vector 700-1 to the decoder 145.

FIG. 7A is a first step of a decoding step process for obtaining an output text using the 1-1 vector 700-1, and FIG. 7B is a diagram illustrating a second step of the decoding step performed after the first step. Specifically, referring to FIG. 7A, the electronic device 100 may input the 1-1 vector 700-1 and a word (<s>) which is a word starting a sentence into the decoder 145 to obtain a 2-1 vector 710 corresponding to the first word I of the output text. The electronic device 100 may identify a first word of the output text as "I" based on the 2-1 vector 710.

Referring to FIG. 7B, the electronic device 100 may input the 1-1 vector 700-1 and the 2-1 vector 710 to the decoder 145 to obtain a 2-2 vector 720 corresponding to the second word (am) of the output text. The electronic device 100 may identify a second word of the output text as "am" on the basis of the 2-2 vector 720.

The electronic device 100 may keep performing a decoding step as described above and may perform decoding step until a word (e.g., <END>, </S>), which means the end of the sentence, is output. If the decoder 145 outputs a word (e.g., <END>, </S>), which means the end of the sentence in the decoder 145, the electronic device 100 may terminate the decoding step process and identify the final output text through the plurality of second vectors output during the decoding step process.

Figure 7C:
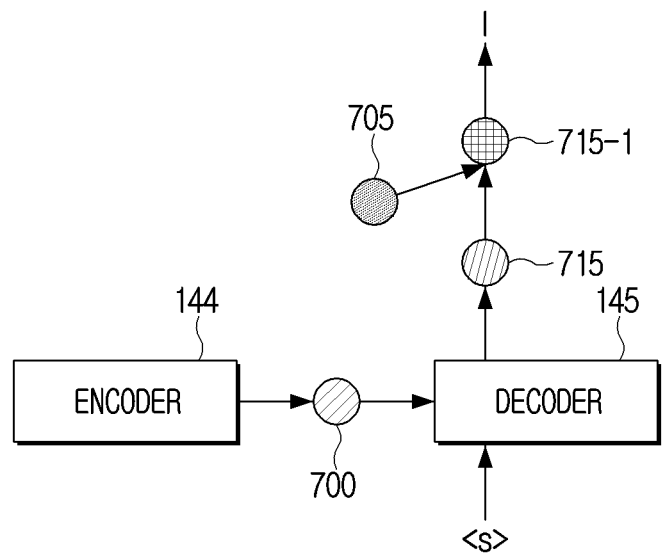
FIG. 7C is a diagram illustrating a first step of a decoding step of obtaining a final output text by reflecting additional information to a second vector according to an embodiment of the disclosure.
Figure 7D:
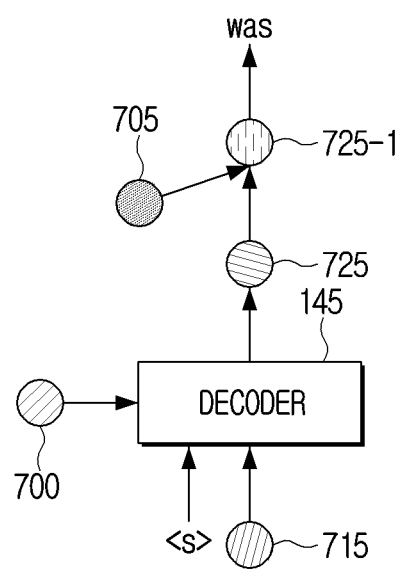
FIG. 7D is a diagram illustrating a second step of a decoding step of obtaining a final output text by reflecting additional information to a second vector according to an embodiment of the disclosure.

It is described that the decoding step of FIG. 7A and FIG. 7B is performed using the 1-1 vector 700-1 in which the additional information 705 is reflected, but the disclosure is not limited thereto. As shown in FIGS. 7C and 7D, the plurality of second vectors output from the decoder may be transformed by the additional information, and the output text may be identified using the plurality of transformed second vectors.

FIGS. 7C and 7D are diagrams illustrating a decoding step of obtaining a final output text by reflecting additional information to the second vector according to various embodiments of the disclosure.

FIG. 7C is a first step of the decoding step of obtaining the output text by reflecting the additional information to the second vector output from the decoder 145 using the first vector 700, and FIG. 7D is a diagram illustrating a second step of the decoding step performed after the first step of FIG. 7C.

Referring to FIG. 7C, the electronic device 100 may obtain the first vector 700 corresponding to the input text through the encoder 144 and may obtain additional information 705 through the second AI model 147-1.

The electronic device 100 may input the first vector 700 and the word (<s>) which starts a sentence to the decoder 145 to obtain a second-1 vector 715 corresponding to the first word of the output text. The electronic device 100 may obtain final 2-1 vector 715-1 in which the additional information 705 is reflected by applying a weight to each of the 2-1 vector 715 and the additional information 705.

The electronic device 100 may identify the first word of the output text as "I" based on the final 2-1 vector 715-1 to which the additional information 705 is reflected (first decoding step).

Referring to FIG. 7D, the electronic device 100 may input the first vector 700 and the 2-1 vector 715 to the decoder 145 to obtain a 2-2 vector 725 corresponding to a second word of the output text. The electronic device 100 may obtain a final 2-2 vector 725-1 in which the additional information 705 is reflected by applying a weight to each of the 2-2 vector 725 and the additional information 705. As an example, the weight of the 2-2 vector 725 may be higher than the weight of the additional information 705.

The electronic device 100 may identify the second word of the output text as "was" based on the final 2-2 vector 725-1 to which the additional information 705 is reflected (second decoding step).

The electronic device 100 may keep performing a decoding step as described above and may perform a decoding step until a word indicating the end of the sentence is output (e.g., <END>, </S>). When the decoder 145 outputs a word (e.g., <END>, </S>) indicating the end of the sentence, the electronic device 100 may terminate the decoding step process and combine the additional information 705 to the plurality of second vectors output during the decoding step to identify the final output text through the obtained final second vectors.

As illustrated in FIGS. 7A and 7B, the additional information 705 may be combined with the first vector, but the embodiment is not limited thereto, and the additional information 705 as illustrated in FIGS. 7C and 7D may be combined with the second vector to obtain the output text.

The decoding step process according to the disclosure is a decoding step process when the translation model is implemented as a transformer model and is not limited to the embodiment of FIGS. 7A and 7B described above. For example, in the case of the RNN model, the encoding output vector input to the decoder may be continuously modified while the decoding step process is performed. The vectors input to the decoder in the decoding step may be variously changed according to the features of the translation model.

Figure 8A:
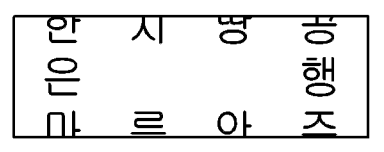

FIG. 8A is a diagram illustrating an image obtained through a wide-angle mode of a camera according to an embodiment of the disclosure.

Figure 8B:
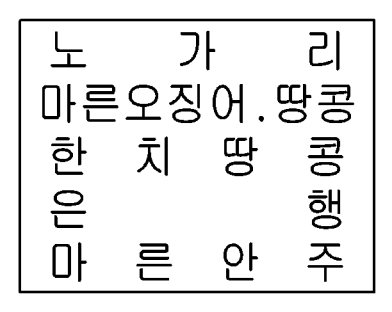

FIG. 8B is a diagram illustrating an image obtained through a super wide-angle mode of a camera according to an embodiment of the disclosure.

Referring to FIG. 8A, the electronic device 100 may obtain an input text (은행) to be translated from an image obtained through the wide-angle mode. If additional information is identified as needed to translate the input text, the electronic device 100 may identify additional information from the image obtained through the wide-angle mode. However, referring to FIG. 8A, when the remaining texts except for the input text (은행) are cut, the electronic device 100 may not be able to identify additional information in the image obtained through the wide-angle mode. In this example, the electronic device 100 may identify additional information from the image obtained through the super wide-angle mode of the camera, as shown in FIG. 8B. The electronic device 100 may identify information about "안주" and "땅콩" text as additional information through the image of FIG. 8B, and the electronic device 100 may identify that the input text (은행) is a text associated with the food through the additional information, and identify the output text for the input text "은행" as "ginkgo fruits" rather than "bank."

Figure 9:
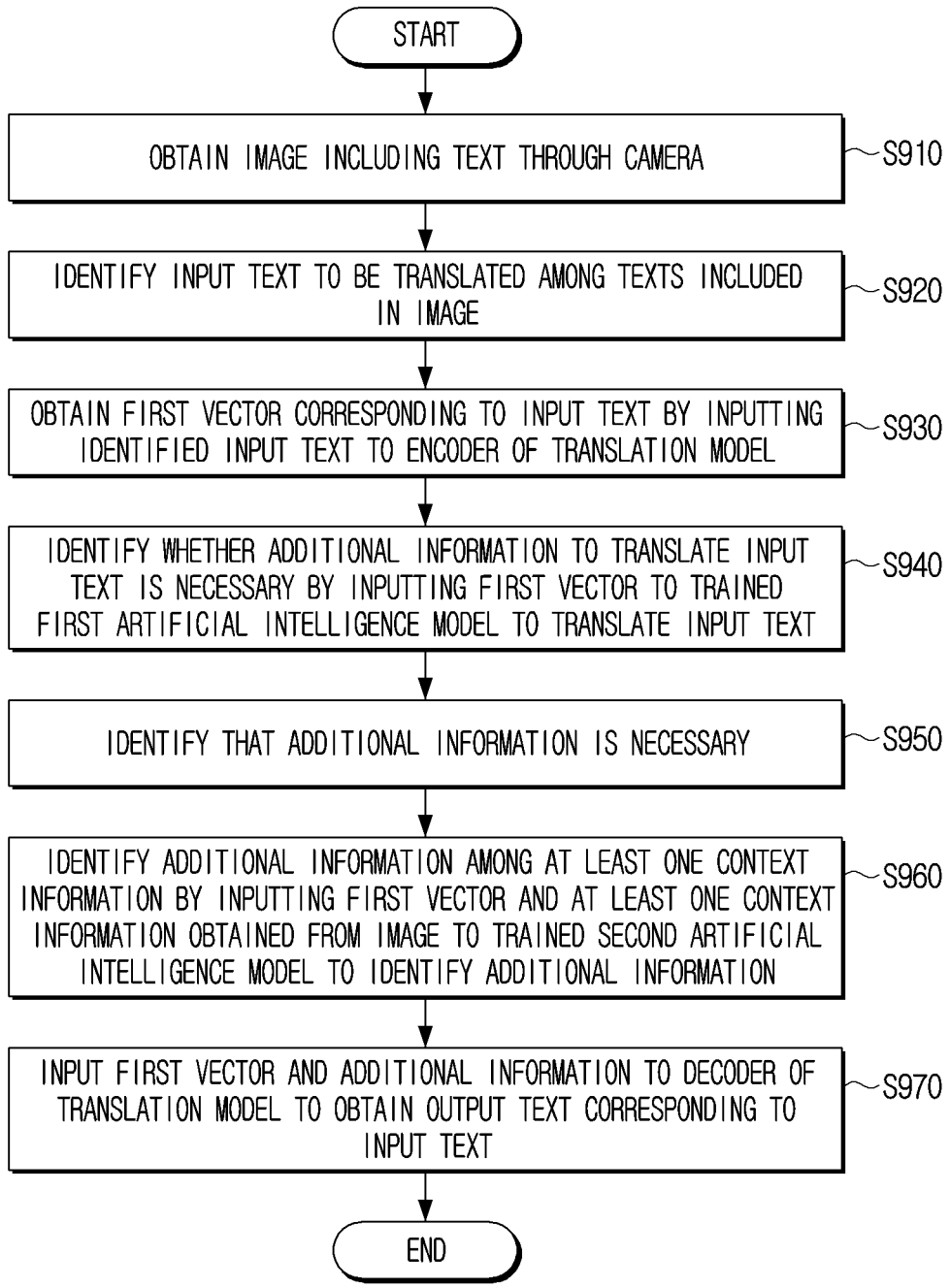
FIG. 9 is a flowchart illustrating a method of controlling an electronic device according to an embodiment of the disclosure.

FIG. 9 is a flowchart illustrating a method of controlling an electronic device according to an embodiment of the disclosure.

Referring to FIG. 9, the electronic device 100 may obtain an image including a text through a camera in operation S910.

According to an embodiment, the camera may include a wide-angle camera, a super wide-angle camera, and a telephoto camera, and the electronic device 100 may obtain the image may through the wide-angle camera, and based on the input text not being identified from the image obtained through the wide-angle camera, the electronic device 100 may identify the input text from the image obtained through at least one of the telephoto camera or the super wide-angle camera.

The electronic device 100 may identify the input text to be translated among the texts included in the image in operation S920.

According to an embodiment, the electronic device 100 may identify a text selected through a user input from at least one text included in the image as an input text. The user input may include various user inputs, such as a user input for dragging text, a user input for selecting text, a user voice input for uttering text, and the like.

According to another embodiment, the electronic device 100 may automatically identify an input text to be translated among at least one text included in the image. For example, the electronic device 100 may identify an input text to be translated based on at least one of a position, a text size, or a font of each of a plurality of texts included in an image.

The electronic device 100 may obtain the first vector corresponding to the input text by inputting the identified input text to the encoder of the translation model in operation S930.

The electronic device 100 may identify whether additional information to translate the input text is necessary by inputting the first vector to the trained first artificial intelligence model to translate the input text in operation S940.

According to an embodiment, the first artificial intelligence model may perform learning with a first learning vector obtained by inputting learning input text to an encoder as input data and with a ratio value between a distribution range between the first learning vector and a plurality of second vectors obtained by inputting at least one first peripheral vector within a preset distribution range to the decoder, and the preset distribution range as output data.

The electronic device 100 may identify that additional information is necessary to translate the input text in operation S950. The electronic device may obtain the ratio value corresponding to the first vector by inputting the first vector to the first artificial intelligence model, and based on the ratio value corresponding to the first vector being greater than or equal to a preset value, may identify that additional information is necessary.

If it is identified that additional information is necessary, the electronic device 100 may identify additional information among the at least one context information by inputting the first vector and at least one context information obtained from the image in operation S960.

The second AI model is a model to perform learning through learning context information corresponding to the learning input text and the learning input text, and identify whether to use the learning context information as additional information about the learning input text.

The second artificial intelligence model may perform learning with a first learning vector obtained by inputting learning input text to the encoder and learning context information corresponding to the learning input text as input data, with the learning context information and information about whether to identify the learning context information as the additional information as output data, and based on the learning context information being identified as additional information based on the output data, the second artificial intelligence model is trained by identifying whether the first learning output text gets closer to a correct answer text by comparing first learning output text obtained by inputting the output data and the first learning vector to the decoder and second learning output text obtained by inputting only the first learning vector to the decoder.

The context information may include information about a text different from an input text included in the image and information about an object included in the image.

The electronic device 100 may obtain, from the image obtained through the camera, information about at least one text different from the input text and information about at least one object included in the image.

The electronic device 100 may identify information about a text related to the input text among information about the at least one text using the second artificial intelligence model. For example, the electronic device 100 may obtain information about the text included in the image through an OCR scheme.

The information about the object related to the input text may be identified among information about one object using the second AI model. For example, the electronic device 100 may identify the object included in the image through the object recognition scheme and may obtain information about the object by analyzing the identified object.

According to an embodiment, the electronic device 100 may identify information about the object if the information about the text associated with the input text is not identified among the information about the at least one text. The electronic device 100 may first perform an OCR scheme in an image, and identify an object included in the image through an object recognition algorithm if the information on the text associated with the input text is not identified.

For example, if additional information is not identified from the image obtained through the wide-angle camera, the electronic device 100 may identify additional information from the image obtained through at least one of the telephoto camera or the super wide-angle camera.

The electronic device 100 may identify at least one of the information about the identified text or the information about the identified object as additional information.

The electronic device 100 may input a first vector and additional information to a decoder of the translation model to obtain an output text corresponding to the input text in operation S970. The electronic device 100 may input a first vector and additional information to a decoder to obtain a second vector corresponding to the first vector, and convert the second vector into an output text through a decoding step.

Figure 10:
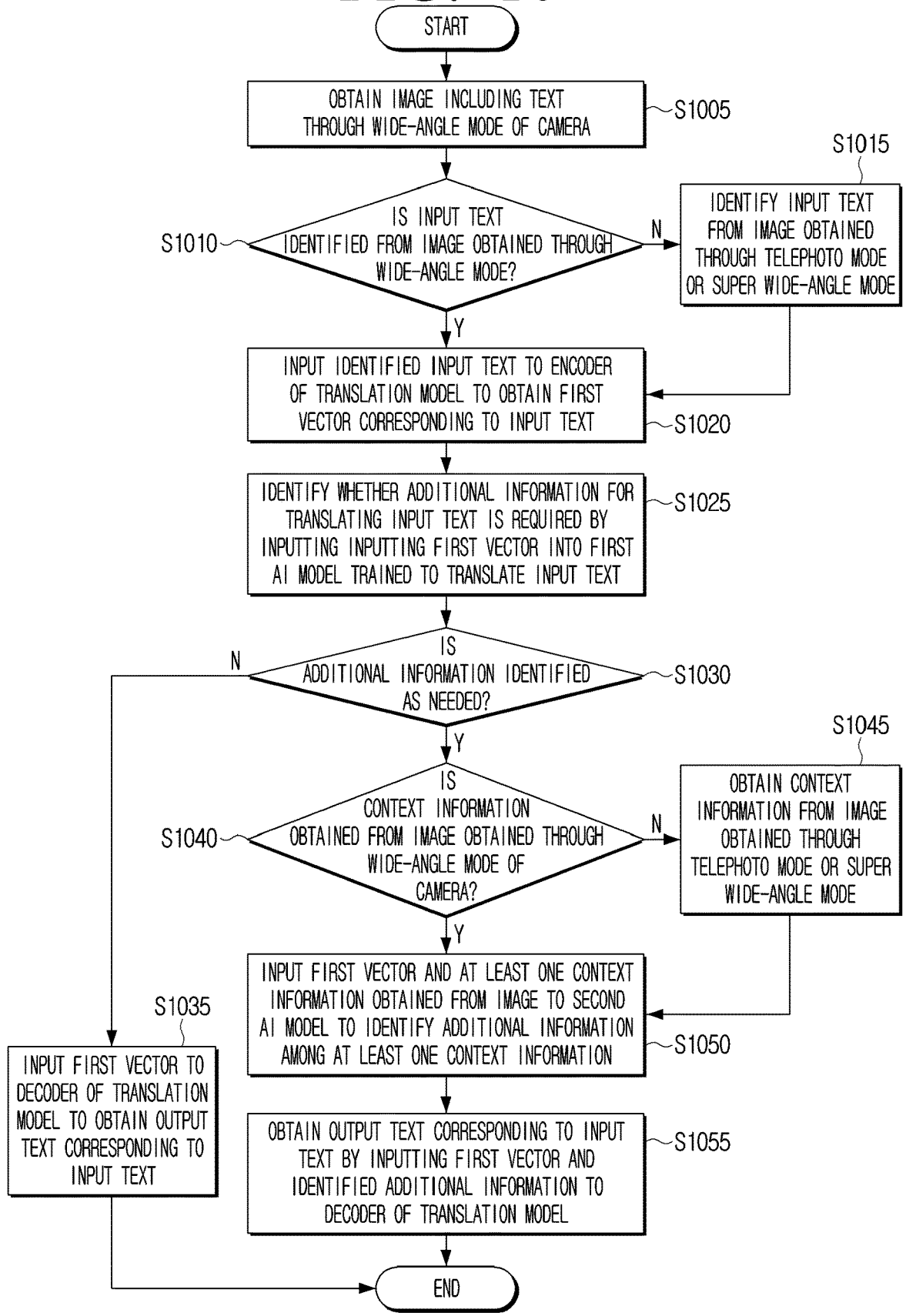
FIG. 10 is a flowchart illustrating a specific control method of an electronic device according to an embodiment of the disclosure.

FIG. 10 is a flowchart illustrating a specific control method of an electronic device according to an embodiment of the disclosure.

Referring to FIG. 10, the electronic device 100 may obtain an image including text through the wide-angle mode of the camera in operation S1005.

If the input text is identified from the image obtained through the wide-angle mode in operation S1010, the electronic device 100 may input the identified input text to the encoder of the translation model to obtain a first vector corresponding to the input text in operation S1020. If the input text is not identified from the image obtained through the wide-angle mode in operation S1010, the electronic device 100 may identify the input text from the image obtained through the camera's telephoto mode or the super wide-angle mode in operation S1015.

If the input text is identified from the image obtained through the wide-angle mode or the input text is identified from the image obtained through the telephoto mode or the super wide-angle mode in operation S1015, the electronic device 100 may input the identified input text to the encoder of the translation model to obtain a first vector corresponding to the input text in operation S1020.

The electronic device 100 may identify whether additional information for translating the input text is required by inputting the first vector into a first AI model trained to translate the input text in operation S1025.

If the additional information is not identified as needed in operation S1030, the electronic device 100 may input a first vector to a decoder of the translation model to obtain an output text corresponding to the input text in operation S1035.

If the additional information is identified as needed in operation S1030, the electronic device 100 may identify whether the context information is obtained from the image obtained through the wide-angle mode of the camera in operation S1040.

If the context information is not obtained from the image obtained through the wide-angle mode of the camera in operation S1040, the electronic device 100 may obtain context information from the image obtained through the telephoto mode or the super wide-angle mode in operation S1045.

If the context information is obtained from the image obtained through the wide-angle mode of the camera in operation S1040 or the context information is obtained from the image obtained through the telephoto mode or the super wide-angle mode in operation S1045, the electronic device 100 may input the first vector and the at least one context information obtained in the image to the second AI model to identify additional information among the at least one context information in operation S1050.

The electronic device 100 may obtain output text corresponding to the input text by inputting the first vector and additional information to the decoder of the translation model in operation S1055.

Figure 11:
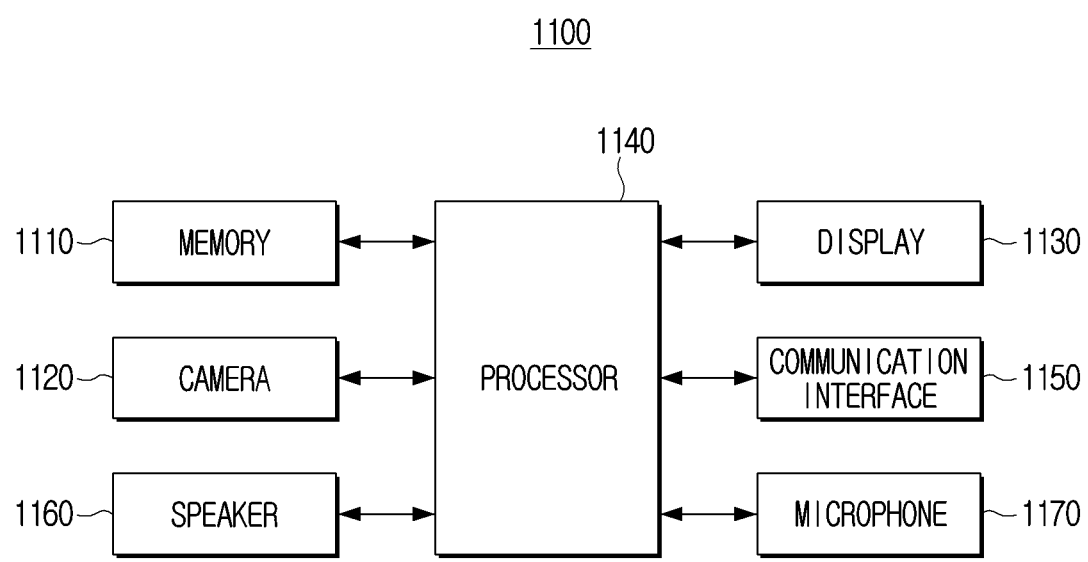
FIG. 11 is a block diagram illustrating a specific configuration of an electronic device according to an embodiment of the disclosure.

FIG. 11 is a block diagram illustrating a specific configuration of an electronic device according to an embodiment of the disclosure.

Referring to FIG. 11, an electronic device 1100 may include a memory 1110, a camera 1120, a display 1130, at least one processor 1140, a communication interface 1150, a speaker 1160, and a microphone 1170. Since the memory 1110, the camera 1120, the display 1130, and the at least one processor 1140 shown in FIG. 11 are overlapped with the memory 110, the camera 120, the display 130, and the at least one processor 140 illustrated in FIG. 1, a repeated description will be omitted.

Depending on the implementation of the electronic device 1100, some of the configurations of FIG. 11 may be removed or other configurations may be added.

The communication interface 1150 may communicate with an external electronic device. The communication interface 1150 with an external device may include communication via a third device (for example, a repeater, a hub, an access point, a server, a gateway, or the like). Wireless communication may include cellular communication using any one or any combination of the following, for example, long-term evolution (LTE), LTE advanced (LTE-A), a code division multiple access (CDMA), a wideband CDMA (WCDMA), and a universal mobile telecommunications system (UMTS), a wireless broadband (WiBro), or a global system for mobile communications (GSM), and the like. According to an embodiment, the wireless communication may include, for example, any one or any combination of Wi-Fi, Bluetooth, Bluetooth low energy (BLE), Zigbee, near field communication (NFC), magnetic secure transmission, radio frequency (RF), or body area network (BAN). Wired communication may include, for example, a universal serial bus (USB), a high definition multimedia interface (HDMI), a recommended standard 232 (RS-232), a power line communication, or a plain old telephone service (POTS). The network over which the wireless or wired communication is performed may include any one or any combination of a telecommunications network, for example, a computer network (for example, local area network (LAN) or wide-area network (WAN)), the Internet, or a telephone network.

The communication interface 1150 may perform communication with an external server and may receive the first AI model and the second AI model which has performed learning.

The speaker 1160 is a configuration for audibly providing information by the electronic device 800. The electronic device 800 may include one or more speakers 1160, and may output a response to the inputted user voice command through the speaker 1160 as an audio signal. The configuration to output audio may be implemented as the speaker 1160, but this is an example and may be implemented as an output terminal.

The microphone 1170 may receive an audio signal including a user voice command. The microphone 1170 may receive an audio signal including a user voice command for causing the electronic device 1100 to perform a specific control command. Although a plurality of microphones 1170 may be provided in the main body of the electronic device 1100, but this is merely exemplary, and the microphone 1170 may be disposed outside and electrically connected to the electronic device 1100.

In one embodiment, the electronic device 1100 may identify the input text in the image received via the camera 1120, via the user voice command received via the microphone 1170.

The disclosure includes various embodiments, some of which are illustrated in the drawings and described in detail in the detailed description. However, this disclosure is not intended to limit the embodiments described herein but includes various modifications, equivalents, and/or alternatives. In the context of the description of the drawings, like reference numerals may be used for similar components.

In describing the disclosure, a detailed description of known functions or configurations incorporated herein will be omitted as it may make the subject matter of the disclosure unclear.

In addition, the embodiments described below may be modified in various different forms, and the scope of the technical concept of the disclosure is not limited to the following embodiments. Rather, these embodiments are provided so that this disclosure will be thorough and complete, and will fully convey the scope of the disclosure to those skilled in the art.

The terms used in this disclosure are used merely to describe a particular embodiment, and are not intended to limit the scope of the claims. The expression of a singular includes a plurality of representations, unless the context clearly indicates otherwise.

In this document, the expressions "have," "may have," "including," or "may include" may be used to denote the presence of a feature (e.g., a component, such as a numerical value, a function, an operation, a part, or the like), and does not exclude the presence of additional features.

The expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B together.

In addition, expressions "first," "second," or the like, used in the disclosure may indicate various components regardless of a sequence and/or importance of the components, will be used only in order to distinguish one component from the other components, and do not limit the corresponding components.

It is to be understood that an element (e.g., a first element) is "operatively or communicatively coupled with/to" another element (e.g., a second element) is that any such element may be directly connected to the other element or may be connected via another element (e.g., a third element).

When an element (e.g., a first element) is "directly connected" or "directly accessed" to another element (e.g., a second element), it may be understood that there is no other element (e.g., a third element) between the other elements.

Herein, the expression "configured to" may be used interchangeably with, for example, "suitable for," "having the capacity to," "designed to," "adapted to," "made to," or "capable of." The expression "configured to" does not necessarily mean "specifically designed to" in a hardware sense.

Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a CPU or AP) that can perform the corresponding actions by executing one or more software programs stored in the memory device.

The terms such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor.

The various elements and regions in the drawings are schematically drawn. Accordingly, the technical spirit of the disclosure is not limited by the relative size or spacing depicted in the accompanying drawings.

The various embodiments described above may be implemented in software, hardware, or the combination of software and hardware. By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described herein may be implemented by the processor. According to a software implementation, embodiments, such as the procedures and functions described herein, may be implemented with separate software modules. Each of the above-described software modules may perform one or more of the functions and operations described herein.

A method according to various embodiments described above may be stored in a non-transitory readable medium. Such a non-transitory computer-readable medium may be loaded and used in a variety of devices.

A non-transitory computer-readable medium refers to a medium that stores data semi-permanently, rather than a medium that stores data for a short moment, such as a register, cache, memory, etc., and refers to a medium readable by a device. Specifically, the programs for performing the various methods described above may be stored and provided in a non-transitory readable medium, such as a compact disc (CD), a digital video disc (DVD), a hard disk, a Blu-ray disc, a universal serial bus (USB), a memory card, ROM, etc.

According to some embodiments, a method disclosed herein may be provided in a computer program product. A computer program product may be traded between a seller and a purchaser as a commodity. A computer program product may be distributed in the form of a machine-readable storage medium (e.g., a CD-ROM) or distributed online through an application store (e.g., PlayStore™). In the case of on-line distribution, at least a portion of the computer program product may be stored temporarily or at least temporarily in a storage medium, such as a manufacturer's server, a server in an application store, a memory in a relay server, and the like.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A method performed by an electronic device, the method comprising:
    obtaining, by the electronic device through a camera of the electronic device, an image comprising text;
    identifying, by the electronic device, input text, to be translated among texts included in the image;
    obtaining, by the electronic device, a first vector corresponding to the input text by inputting the input text to an encoder of a translation model;
    identifying, by the electronic device, whether additional information is necessary to translate the input text by inputting the first vector to a first artificial intelligence model trained to translate the input text, wherein the first artificial intelligence model is trained using a ratio value corresponding to the first vector, and wherein the additional information is identified as being necessary to translate the input text based on a result of comparing the ratio value with a preset value;
    based on identifying that the additional information is necessary, identifying, by the electronic device, the additional information among context information by inputting the first vector and at least one piece of context information obtained from the image to a second artificial intelligence model trained to identify the additional information; and
    obtaining, by the electronic device, output text corresponding to the input text by inputting the first vector and the additional information to a decoder of the translation model.

2. The method of claim 1, wherein the first artificial intelligence model is further trained with:
    a first learning vector obtained by inputting learning input text to the encoder, as input data; and
    the ratio value between a distribution range between the first learning vector and a plurality of second vectors obtained by inputting at least one first peripheral vector within a preset distribution range to the decoder, and the preset distribution range, as output data.

3. The method of claim 2, wherein the identifying of whether the additional information is necessary comprises:
    obtaining the ratio value corresponding to the first vector by inputting the first vector to the first artificial intelligence model; and
    based on the ratio value corresponding to the first vector being greater than or equal to the preset value, identifying that the additional information is necessary.

4. The method of claim 1,
wherein the second artificial intelligence model being configured to perform learning with:
    a first learning vector obtained by inputting learning input text to the encoder and learning context information corresponding to the learning input text, as input data, and
    the learning context information and information about whether to identify the learning context information as the additional information, as output data, and
wherein, based on the learning context information being identified as the additional information based on the output data, the second artificial intelligence model is trained by identifying whether first learning output text gets closer to a correct answer text by comparing first learning output text obtained by inputting the output data and the first learning vector to the decoder and second learning output text obtained by inputting only the first learning vector to the decoder.

5. The method of claim 1,
wherein the context information comprises information about text different from the input text included in the image and information about an object included in the image, and
wherein the identifying of the additional information further comprises:
    obtaining, from the image, information about at least one text different from the input text and information about at least one object included in the image,
    identifying information about text related to the input text among the information about the at least one text using the second artificial intelligence model,
    identifying information about the object related to the input text among the information about the at least one object using the second artificial intelligence model, and
    identifying at least one of the information about the text or the information about the at least one object as the additional information.

6. The method of claim 5, wherein the obtaining of the information comprises:
    obtaining information about the text included in the image through an optical character reader (OCR) scheme; and
    obtaining the information about the object by identifying the object included in the image through an object recognition scheme and analyzing the identified object.

7. The method of claim 5, wherein the identifying of the information about the object related to the input text is performed based on the information about the text related to the input text not being identified from among the information about the at least one text.

8. The method of claim 1, wherein the obtaining of the output text comprises:
    obtaining a second vector corresponding to the first vector by inputting the first vector and the additional information to the decoder; and
    obtaining the output text based on the second vector.

9. The method of claim 1,
wherein the camera comprises a wide-angle camera, a super wide-angle camera, and a telephoto camera,
wherein the obtaining of the image comprises obtaining the image through the wide-angle camera, and
wherein the identifying of the input text comprises, based on the input text not being identified from the image obtained through the wide-angle camera, identifying the input text from the image obtained through at least one of the telephoto camera or the super wide-angle camera.

10. The method of claim 1,
wherein the camera comprises a wide-angle camera, a super wide-angle camera, and a telephoto camera,
wherein the obtaining of the image comprises obtaining the image through the wide-angle camera, and
wherein the identifying of the additional information comprises, based on the additional information not being identified from the image obtained through the wide-angle camera, identifying the additional information from an image obtained through at least one of the telephoto camera or the super wide-angle camera.

11. An electronic device comprising:
a camera;
memory storing one or more computer programs; and
one or more processors communicatively coupled to the memory and the camera,
wherein the one or more computer programs include computer-executable instructions that, when executed by the one or more processors individually or collectively, cause the electronic device to:
obtain an image comprising text through the camera,
identify input text, to be translated among texts included in the image, to be translated,
obtain a first vector corresponding to the input text by inputting the input text to an encoder of a translation model,
identify whether additional information is necessary to translate the input text by inputting the first vector to a first artificial intelligence model trained to translate the input text, wherein the first artificial intelligence model is trained using a ratio value corresponding to the first vector, and wherein the additional information is identified as being necessary to translate the input text based on a result of comparing the ratio value with a preset value,
based on identifying that the additional information is necessary, identify the additional information among context information by inputting the first vector and at least one piece of context information obtained from the image to a second artificial intelligence model trained to identify the additional information, and
obtain output text corresponding to the input text by inputting the first vector and the additional information to a decoder of the translation model.

12. The electronic device of claim 11, wherein the first artificial intelligence model is further trained with:
a first learning vector obtained by inputting learning input text to the encoder, as input data; and
the ratio value between a distribution range between the first learning vector and a plurality of second vectors obtained by inputting at least one first peripheral vector within a preset distribution range to the decoder, and the preset distribution range, as output data.

13. The electronic device of claim 12, wherein the one or more computer programs further include computer-executable instructions that, when executed by the one or more processors individually or collectively, cause the electronic device to:
obtain the ratio value corresponding to the first vector by inputting the first vector to the first artificial intelligence model; and based on the ratio value corresponding to the first vector being greater than or equal to the preset value, identify that the additional information is necessary.

14. The electronic device of claim 11,
wherein the second artificial intelligence model being configured to perform learning with:
a first learning vector obtained by inputting learning input text to the encoder and learning context information corresponding to the learning input text, as input data, and
the learning context information and information about whether to identify the learning context information as the additional information, as output data, and
wherein, based on the learning context information being identified as the additional information based on the output data, the second artificial intelligence model is trained by identifying whether first learning output text gets closer to a correct answer text by comparing first learning output text obtained by inputting the output data and the first learning vector to the decoder and second learning output text obtained by inputting only the first learning vector to the decoder.

15. The electronic device of claim 11,
wherein the context information comprises information about a text different from the input text included in the image and information about an object included in the image, and
wherein the one or more computer programs further include computer-executable instructions that, when executed by the one or more processors individually or collectively, cause the electronic device to:
obtain, from the image, information about at least one text different from the input text and information about at least one object included in the image,
identify information about text related to the input text among the information about the at least one text using the second artificial intelligence model,
identify information about the object related to the input text among the information about the at least one object using the second artificial intelligence model, and
identify at least one of the information about the text or the information about the at least one object as the additional information.

16. The electronic device of claim 15, wherein the one or more computer programs further include computer-executable instructions that, when executed by the one or more processors individually or collectively, cause the electronic device to:
obtain information about the text included in the image through an optical character reader (OCR) scheme, and
obtain the information about the object by identifying the object included in the image through an object recognition scheme and analyzing the identified object.

17. The electronic device of claim 15, wherein the one or more computer programs further include computer-executable instructions that, when executed by the one or more processors individually or collectively, cause the electronic device to:
identify the information about the object related to the input text is performed based on the information about the text related to the input text not being identified from among the information about the at least one text.

18. The electronic device of claim 11, wherein the one or more computer programs further include computer-executable instructions that, when executed by the one or more processors individually or collectively, cause the electronic device to:

obtain a second vector corresponding to the first vector by inputting the first vector and the additional information to the decoder; and obtain the output text based on the second vector.

19. The electronic device of claim 11, wherein the camera comprises a wide-angle camera, a super wide-angle camera, and a telephoto camera, and wherein the one or more computer programs further include computer-executable instructions that, when executed by the one or more processors individually or collectively, cause the electronic device to:

obtain the image through the wide-angle camera, and based on the input text not being identified from the image obtained through the wide-angle camera, identify the input text from the image obtained through at least one of the telephoto camera or the super wide-angle camera.

20. The electronic device of claim 11, wherein the camera comprises a wide-angle camera, a super wide-angle camera, and a telephoto camera, and wherein the one or more computer programs further include computer-executable instructions that, when executed by the one or more processors individually or collectively, cause the electronic device to:

obtain the image through the wide-angle camera, and based on the additional information not being identified from the image obtained through the wide-angle camera, identify the additional information from an image obtained through at least one of the telephoto camera or the super wide-angle camera.

\* \* \* \* \*